Sept. 9, 1952     D. W. BROUS     2,609,974
DISPOSABLE PLASTIC VALVE
Filed April 19, 1950
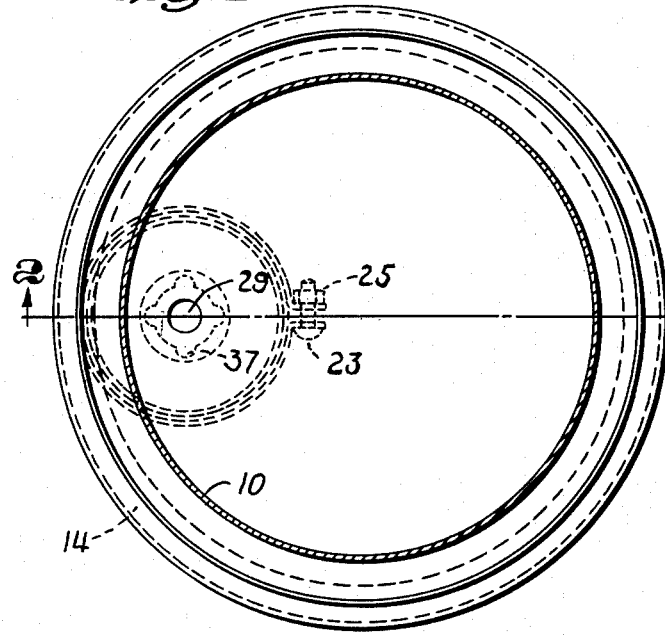
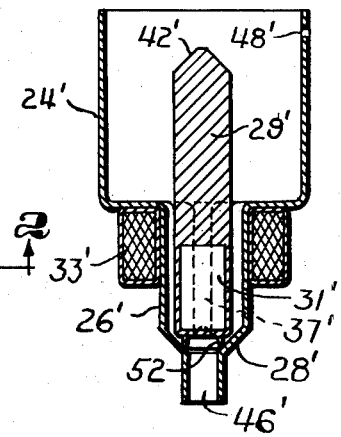
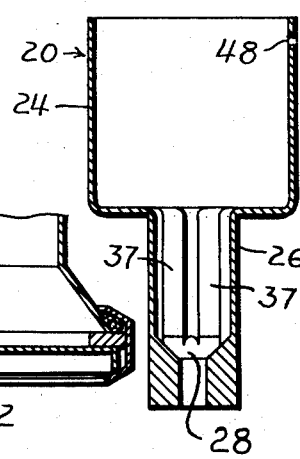
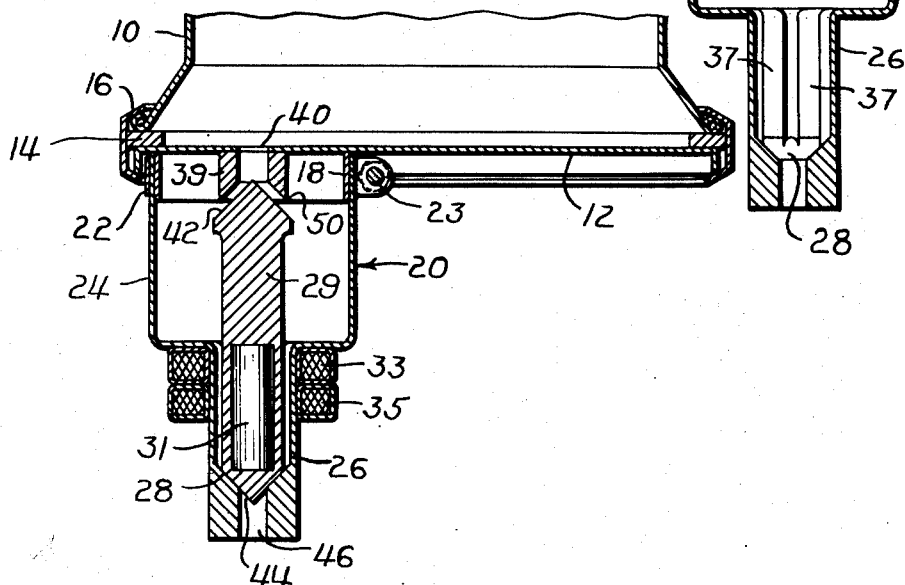
Inventor:
Donald W. Brous
by Bryn Beecher
Attorney Patented Sept. 9, 1952

2,609,974

UNITED STATES PATENT OFFICE 2,609,974

DISPOSABLE PLASTIC VALVE

Donald W. Brous, Francestown, N. H., assignor to Food Engineering Corporation, Manchester, N. H., a corporation of New Hampshire Application April 19, 1950, Serial No. 156,898

8 Claims. (Cl. 222—442)

My invention relates to a disposable valve structure especially adapted for use in the dispensing of beverages from bulk containers. The invention is considered particularly valuable as applied to milk vending machines, especially those of the coin operated type.

Valves employed in such equipment must conform with rigid specifications set by strictly enforced sanitary codes. These specifications, in the main, go to the finishing of the internal surfaces of the valve and have particular reference to the avoidance of crevices, sharp corners, etc., which would make the valve difficult to clean. While doubtless warranted from a health standpoint, they add greatly to the cost of the valve and, in some instances, so complicate the structure that the valve gives trouble on use, especially in the respect of leakage.

Thorough sterilization of a valve or other part of a milk vending machine or the like cannot, of course, be assured by such regulations, but only by the most careful supervision of the individuals charged with the work. At best, there is always the fear that an expensive permanent valve may be damaged during the handling incident to its cleaning and sterilization. And when damage occurs it not infrequently happens that it goes unnoticed, with the result that the valve is reinstalled in its damaged condition, causing faulty operation of the machine as a whole.

My invention has as its principal object to provide a valve for the purpose indicated, which can be manufactured at a cost so low that it is economic to discard it after a single period of use. Such a valve obviously does not need to meet the above-mentioned specifications and, accordingly, can be constructed in a simple, truly functional form.

A further object of the invention is to provide a valve which can be constructed chiefly of a plastic, as polystyrene or polyethene, for instance.

A still further object is to provide a disposable valve which is positive in action, which is not prone to leak, and which is easily installed and removed.

Another object is to provide a disposable valve which is capable of performing a metering function.

Other objects, advantages and features of the invention will be apparent from the following description, which will proceed with reference to the accompanying drawings, in which:

Figs. 1 and 2 illustrate a preferred form of valve for use in the dispensing of milk from a conventional 5- or 10-gallon milk can, the valve being shown in association with such a can;

Fig. 3 is a sectional detail of the body of the valve; and

Fig. 4 illustrates a modified form of valve.

Referring first particularly to Figs. 1–3, the milk can 10, which is supported in an up-ended position, is provided with a special flanged lid 12, held fast against a sealing ring 14 by a ring clamp 16. Fixed, as by welding, to the external face of the lid 12 slightly inwardly of its periphery is an annular piece 18 to which the valve 20 is fastened by means of a strap 22. This strap is made tight by turning the screw 23 in the nut 25, which may be fixed to the strap.

The body of the valve 20 is formed entirely of plastic, most suitably polyethene, and includes a cylindrical cup portion 24 and a cylindrical portion 26 of reduced cross section. The latter portion is formed to provide an internal valve seat 28 shaped complementarily with respect to the lower end of the plastic plunger 29. This plunger has a magnetic core 31 and is actuated by means of coils 33 and 35; coil 33 being the "up" coil, coil 35 being the "down" coil. To facilitate the egress of the milk when the plunger 29 is in raised position, the internal surface of the portion 26 of the valve body is grooved at 37 (see Fig. 3). Plunger 29 is guided solely by the portion 26 and the valve seat 39, which is fixed to the lid 12 of the can 10, as by welding, around and under an aperture 40 in the lid.

As shown in Fig. 2, plunger 29 is in its normal position. Upon energization of the coil 33, as by insertion of a coin in a vending machine including the parts illustrated, a machine such as described in my copending application Serial No. 49,509, filed September 16, 1948, now Patent No. 2,591,507, issued April 1, 1952, for example, the ferrous core or plug 31, embedded in the plastic of the plunger, tends to center in the field created by the coil, with the result that the plunger is carried upwardly until the conical head 42 thereof becomes seated in the seat 39. A conventional timing device forming part of the equipment of the vending machine keeps the coil energized until the valve body has emptied. At this point coil 35 is momentarily energized to positively seat the end 44 of the plunger in the seat 28, whereafter the valve body again fills with milk.

To prevent the "gurgling" which would otherwise obtain due to air entering the system through the port 46 during emptying of the valve body, the cup portion 24 thereof is provided with an aperture 48 (see Fig. 3) which is positioned above the level of the edge 50 of the valve seat 39. This aperture serves to equalize the pressure above and below the milk in the valve body. Contrary to what might be expected, no milk is lost through the aperture on the subsequent refilling of the valve body. This follows because milk can flow from the container 10 only when an equivalent quantity of air can enter the container to replace the milk and the air must necessarily be derived through the valve body. Let it be assumed that plunger 29 is in the position as shown in Fig. 2 with the valve body in the process of being filled with milk. When the milk reaches the edge 50 of the seat 39, which provides what amounts to a liquid seal, it is obvious, since additional air is prevented from entering the container, that milk can flow from the container only by reason of the static head represented by the contained column of milk. Very little flow occurs by reason of the static head before sufficient vacuum develops above the milk level in the container to halt the flow. Aperture 48, of course, is so positioned that it is not reached incident to the flow caused by the static head.

From the foregoing, it will be appreciated that the quantity of milk dispensed on elevation of the plunger is determined by the length of the plunger 29 and the member providing the seat 39. Thus, the valve can be made in one standard size for a number of applications in which differing amounts of liquid are dispensed.

As indicated by Fig. 4, I may dispense with the coil 35 and use only an "up" coil 33'. In this case, I have found it advantageous to so mold the plunger 29' that it terminates at its lower end in a ring portion 52 of narrow section. This ring or fin rests on the sloping walls of the seat 28' in the normal position of the plunger. It will, of course, be understood that in such embodiment the plunger seats of its own weight in the seat 28' following de-energization of the single coil. If desired, the coil 31' may have somewhat greater mass than in the case of the embodiment previously described.

The fact that the valve herein is manufactured of plastic material not only renders the valve disposable, but greatly simplifies its actuation by electro-magnetic means, since the problem of residual magnetism encountered in the case of other magnetically operated devices is eliminated.

Having thus described and illustrated my invention, what I claim is:

1. A disposable, metering valve structure suited for use in the dispensing of a liquid from an up-ended bulk container or the like comprising a lid provided with a fixture affording a valve seat, which seat is spaced from the external surfaces of the lid in the immediate area of the fixture, said valve structure including a plastic body member adapted to be detachably secured under and about said valve seat, said body member including a cup portion having an aperture therein and a portion providing a second valve seat below the level of the bottom of the cup portion, and a plastic plunger reciprocal within said body member having a magnetic core and opposed terminal portions shaped for seating in said valve seats, the aperture in said cup portion being so located that in operation of the valve structure the same stands at a level above that of the lower edges of the valve seat associated with said lid.

2. A valve structure as defined by claim 1 in which the terminal portion of the plunger complementary to the second valve seat carries a fin directly contacting said seat.

3. A disposable, metering valve structure suited for use in the dispensing of a liquid from an up-ended bulk container or the like comprising a lid provided with a fixture affording a valve seat, which seat is spaced from the external surfaces of the lid in the immediate area of the fixture, said valve structure including a plastic body member adapted to be detachably secured to said lid under and about said valve seat, said body member including a cup portion having an aperture therein and a portion of reduced cross-sectional area extending from the bottom of the cup portion providing a second valve seat, and a plastic plunger reciprocal within and guided by said last-mentioned portion having a magnetic core and opposed terminal portions shaped for seating in said valve seats, the aperture in said cup portion being so located that in operation of the valve structure the same stands at a level above that of the lower edges of the valve seat associated with said lid.

4. A valve structure as defined by claim 3 in which the internal walls of the said portion of reduced cross-sectional area are grooved.

5. A liquid dispensing system comprising a container confining the liquid to be dispensed, said container being provided with a fixture extending from the bottom of the container affording a valve seat spaced from the external surfaces of the container in the immediate area of the fixture, a plastic valve body secured to said container under and about said valve seat, said body member having a cup portion through which it is attached to the container and a portion providing a second valve seat below the bottom of the cup portion, means at a level mediate the bottom of the container and the lower edges of the said first valve seat allowing for the ingress of air into the system, a plastic plunger reciprocal within said valve body having a magnetic core and opposed terminal portions shaped for seating in said valve seats, and electrical means external of said valve body for actuating said plunger.

6. A liquid dispensing system comprising a container confining the liquid to be dispensed, said container being provided with a fixture extending from the bottom of the container affording a valve seat spaced from the external surfaces of the container in the immediate area of the fixture, a plastic valve body secured to said container under and about said valve seat, said valve body including a cup portion and a portion of reduced cross-sectional area extending from the bottom of the cup portion providing a second valve seat, means at a level mediate the bottom of the container and the lower edges of the said first valve seat allowing for the ingress of air into the system, a plastic plunger reciprocal within and guided by the reduced portion of said valve body having a magnetic core and opposed terminal portions shaped for seating in said valve seats, and electrical means external of said valve body for actuating said plunger.

7. A system as defined by claim 6 in which the internal walls of the said portion of reduced cross-sectional area are grooved.

8. A system as defined by claim 6 in which the terminal portion of the plunger complementary to the second valve seat carries a fin directly contacting said seat.

DONALD W. BROUS.

REFERENCES CITED

The following references are of record in the file of this patent:

UNITED STATES PATENTS

| Number | Name | Date |
|---|---|---|
| 2,248,953 | Christensen et al. | July 15, 1941 |
| 2,320,128 | Hall | May 25, 1943 |
| 2,335,245 | Gustafson | Nov. 30, 1943 |
| 2,442,599 | Herrick et al. | June 1, 1948 |

FOREIGN PATENTS

| Number | Country | Date |
|---|---|---|
| 17,962 | Great Britain | July 29, 1914 |
| 208,703 | Great Britain | July 10, 1924 |